(12) United States Patent
Hu

(10) Patent No.: US 12,029,290 B2
(45) Date of Patent: Jul. 9, 2024

(54) WIRELESS EARPHONES CASE PRODUCTION PROCESS

(71) Applicant: Dongguan Haotong Plastics Technology Co., Ltd., Dongguan (CN)

(72) Inventor: Yijin Hu, Dongguan (CN)

( * ) Notice: Subject to any disclaimer, the term of this patent is extended or adjusted under 35 U.S.C. 154(b) by 67 days.

(21) Appl. No.: 17/613,939

(22) PCT Filed: Apr. 12, 2021

(86) PCT No.: PCT/CN2021/086591
§ 371 (c)(1),
(2) Date: Nov. 23, 2021

(87) PCT Pub. No.: WO2022/151602
PCT Pub. Date: Jul. 21, 2022

(65) Prior Publication Data
US 2023/0157429 A1    May 25, 2023

(30) Foreign Application Priority Data

Jan. 13, 2021   (CN) .......................... 202110041070.1
Jan. 13, 2021   (CN) .......................... 202120093617.8

(51) Int. Cl.
| | |
|---|---|
| *B23C 3/00* | (2006.01) |
| *A45C 11/00* | (2006.01) |
| *A45C 13/02* | (2006.01) |
| *B23K 26/362* | (2014.01) |
| *B26F 1/14* | (2006.01) |
| *B29C 45/14* | (2006.01) |
| *B29C 51/02* | (2006.01) |
| *B29C 51/26* | (2006.01) |

(52) U.S. Cl.
CPC .............. *A45C 11/00* (2013.01); *A45C 13/02* (2013.01); *B23C 3/00* (2013.01); *B23K 26/362* (2013.01); *B26F 1/14* (2013.01); *B29C 45/14008* (2013.01); *B29C 51/02* (2013.01); *B29C 51/268* (2013.01); *A45C 2011/001* (2013.01)

(58) Field of Classification Search
CPC ................................................. B29C 45/17008
See application file for complete search history.

(56) References Cited

U.S. PATENT DOCUMENTS

2017/0163305 A1*   6/2017   Bao ................... B29C 45/14008
2021/0085047 A1*   3/2021   Wright ................... A45C 13/02

FOREIGN PATENT DOCUMENTS

CN            107756722 A   *   3/2018   ......... B29C 45/1418

* cited by examiner

*Primary Examiner* — Nahida Sultana
*Assistant Examiner* — Virak Nguon
(74) *Attorney, Agent, or Firm* — Novoclaims Patent Services LLC; Mei Lin Wong

(57) ABSTRACT

The present invention relates to the technical field of Bluetooth earphones, and discloses a Bluetooth earphones case and the production process thereof, comprising a protective case body which consists of an upper cover and a lower cover, wherein the upper cover and the lower cover match, a connecting strap is arranged between the upper cover and the lower cover, the lower cover is made with a charging port at the bottom, arranged with a snap at the top of the front, and made with a placement slot inside, and the outside of the protective case body has anti-slip lines. The present invention solves the problems that the Bluetooth earphones cases in the prior art are inconvenient to use and prone to damage, so it is worthy of popularization and use.

1 Claim, 7 Drawing Sheets

WIRELESS EARPHONES CASE PRODUCTION PROCESS

CROSS REFERENCE OF RELATED APPLICATION

This is a national phase national application of an international patent application number PCT/CN2021/086591 with a filing date of Apr. 12, 2021, which claimed priority of Chinese application number 202120093617.8, filing date Jan. 13, 2021; and Chinese application number 202110041070.1, filing date Jan. 13, 2021. The contents of these specifications, including any intervening amendments thereto, are incorporated herein by reference.

FIELD OF INVENTION

The present invention relates to the technical field of Bluetooth earphones, and more specifically, to a Bluetooth earphones case and the production process thereof.

DESCRIPTION OF RELATED ARTS

Bluetooth earphones are hands-free earphones with the Bluetooth technology which allow users to talk freely and easily in a variety of ways without the hassle of wires. Since the advent of Bluetooth earphones, they have been a great tool for mobile business people to improve their productivity.

Most of the Bluetooth earphones cases in the prior art are inconvenient to use, not durable, and prone to damage, and the outer cover of the case is easily lost, increasing the burden for use. Therefore, we disclose a Bluetooth earphones case and the production process thereof to solve the above-mentioned problems.

SUMMARY OF THE PRESENT INVENTION

An object of the present invention is to provide a Bluetooth earphones case and the production process thereof which have the advantage of preventing the outer cover from being lost, solving the problems that most of the Bluetooth earphones cases in the prior art are inconvenient to use, not durable, and prone to damage, and the outer cover of the case is easily lost, increasing the burden for use.

To achieve the above-mentioned object, the present invention provides a technical solution: a Bluetooth earphones case, comprising a protective case body which consists of an upper cover and a lower cover, wherein the upper cover and the lower cover match, a connecting strap is arranged between the upper cover and the lower cover, the lower cover is made with a charging port at the bottom, arranged with a snap at the top of the front, and made with a placement slot inside, and the outside of the protective case body has anti-slip lines.

Preferably, an indicator light hole is made in the front of the lower cover at the top.

Preferably, a hanging ring is bolted to the right side of the lower cover.

Preferably, the upper cover has a bump on its inner wall.

Preferably, a laser engraving area is reserved in the front of the lower cover.

Preferably, the upper cover, the lower cover and the connecting strap are of a one-piece design, and the connecting strap is made of a TPU elastomer injection molding material.

The production process of the Bluetooth earphones case includes the following steps:

Step 1: Sheets: First place the prepared raw materials into the mold cavity for heating and melting, extrude and elongate the melted raw materials to form the basic structure of the upper and lower covers, take out the upper and lower covers, cool, and then punch.

Step 2: Sheet punching: Place and fix the lower cover on the equipment, punch the lower cover with a punching die, punch a charging port in the lower cover at the bottom, punch an indicator light hole in the lower cover at the back side, and then carry out the forming operation.

Step 3: Sheet forming: Apply pressure and soften three sheets using a heater through the equipment. Through the clamping of the forming die, the sheets are changed into the final desired 3D shape to complete the operation of the sheets forming process.

Step 4: Die-cutting of sheets: let the formed sheets pass through a cutting die through the equipment. During the clamping of the cutting die, the upper die punch moves relative to the lower die cavity to punch and separate the formed sheets, so as to obtain the required 3D sheet products.

Step 5: Injection molding: put and well position the formed and cut sheet into an injection mold, then close the mold, inject the plastic raw materials into the injection mold after clamping of the molding parts and the casting system, to about 95% of the mold cavity, cool through the mold temperature regulating system, and then remove the molded upper and lower covers from the injection mold, to complete the operation.

Step 6: CNC machine-shaping: put and position the injection molded products into special tooling through the CNC machining equipment, and complete the shaping of the charging port through tool cutting and machining.

Step 7: Laser cutting: Load and position the injection molded products into special tooling through the laser cutting equipment, vaporize the corresponding injection molding material instantly by high-temperature heating with the laser to get the required appearance and shape features.

Compared with the prior art, the present invention provides a Bluetooth earphones case and the production process thereof which have the following beneficial effects:

Designed with a connected structure of the upper cover and the lower cover being connected by a connecting strap, the protective case is not only very convenient to use, strong and durable, more elegant and practical, but also has an improved automatic rebound effect during opening and closing, and prevents the outer cover from being lost, reducing the burden for use and solving the problems that most of the Bluetooth earphones cases in the prior art are inconvenient to use, not durable, and prone to damage, and the outer cover of the case is easily lost, increasing the burden for use, so it is worthy of popularization and use. Besides, the present invention adopts the IMD process for manufacturing, which can further enhance the three-dimensional sense and color performance of the product appearance, greatly improving the design space of the product appearance.

Figure 1:
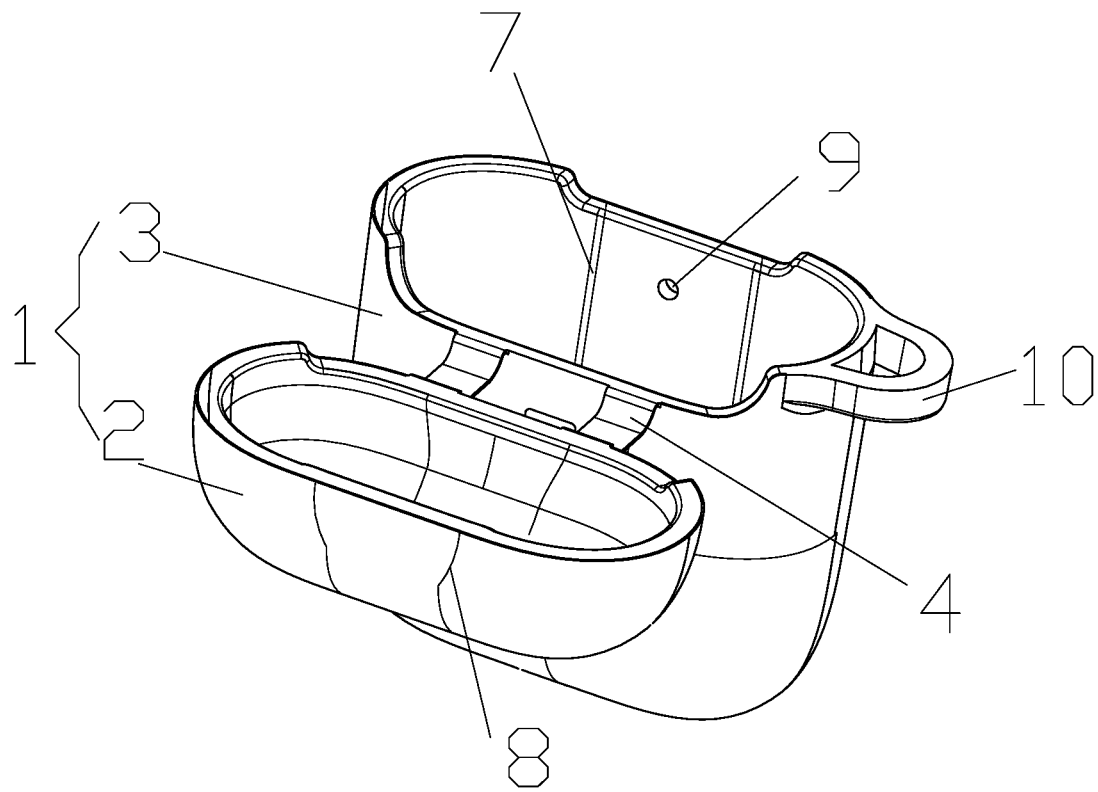
FIG. 1 is a front-view three-dimensional schematic diagram of the structure according to the present invention.
Figure 2:
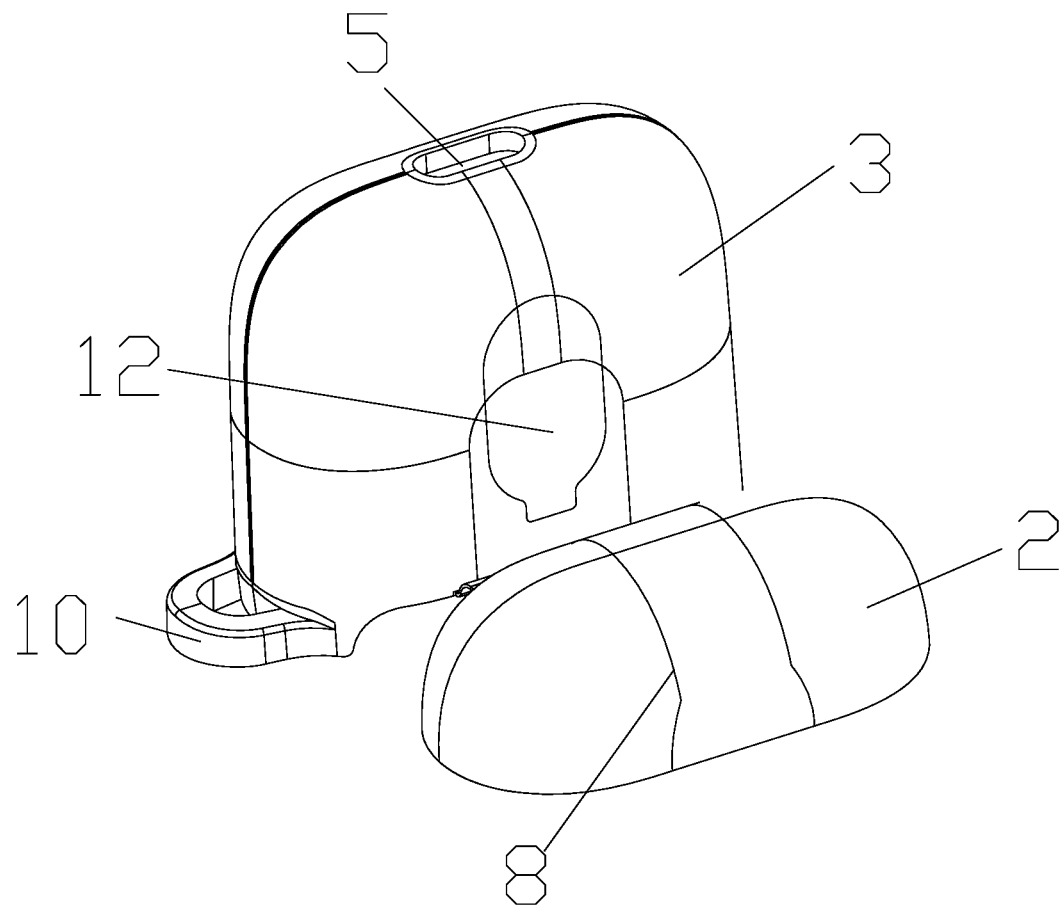
FIG. 2 is a bottom-view three-dimensional schematic diagram of the structure according to the present invention.
Figure 3:
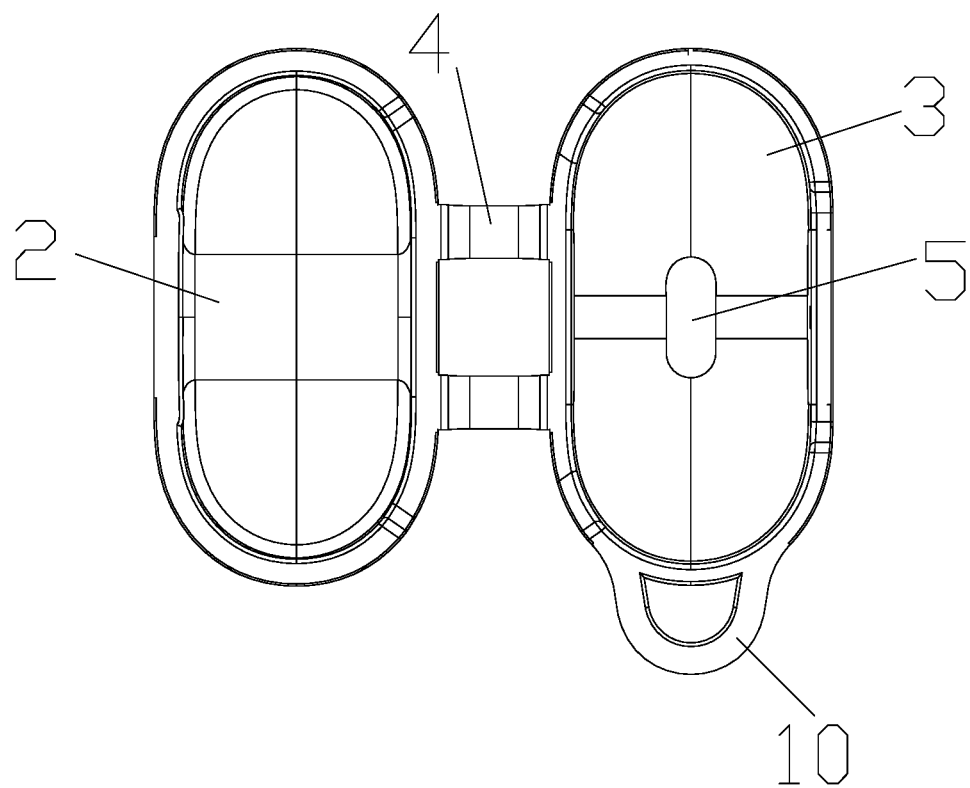
FIG. 3 is a top-view schematic diagram of the structure according to the present invention.
Figure 4:
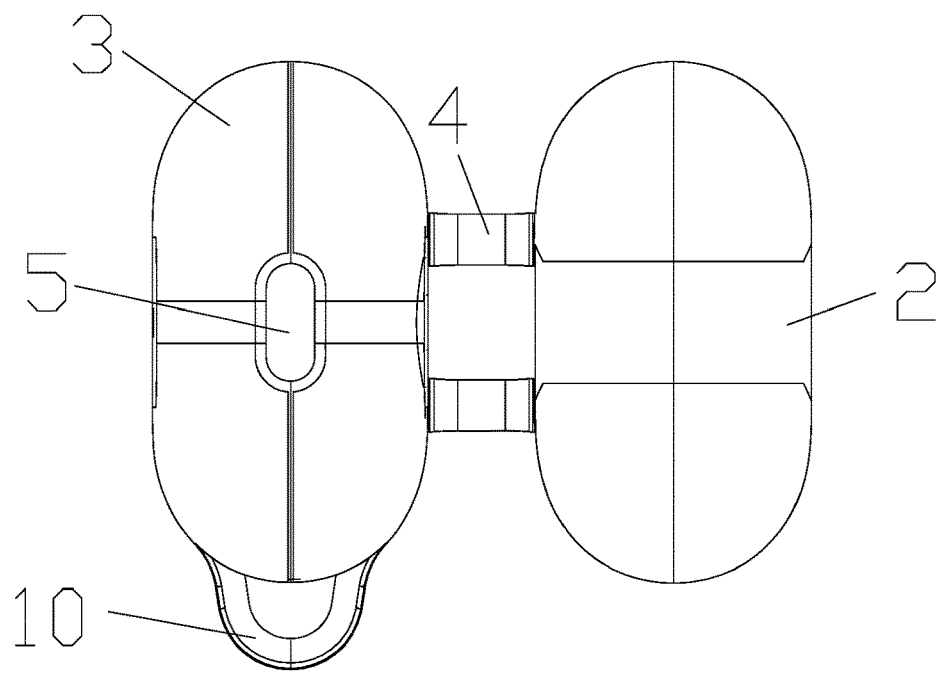
FIG. 4 is a bottom-view schematic diagram of the structure according to the present invention.
Figure 5:
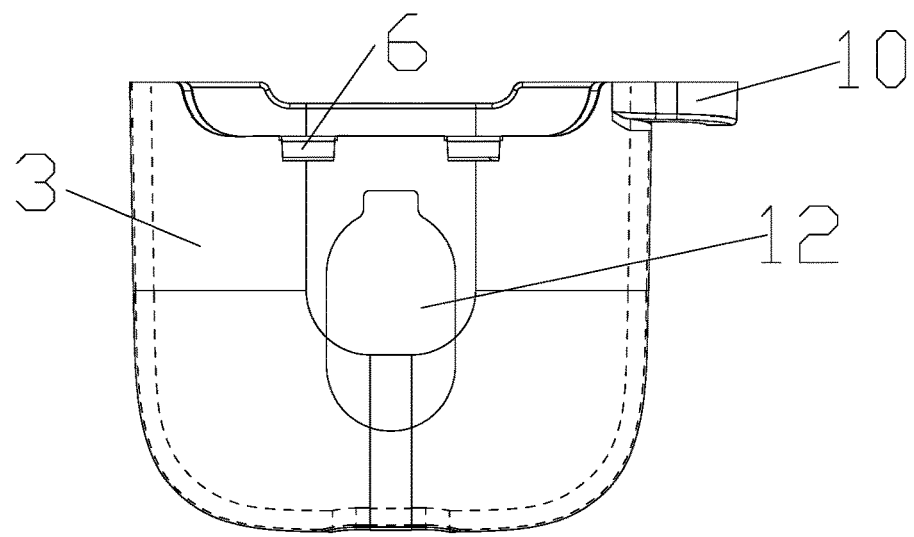
FIG. 5 is a front-view schematic diagram of the structure according to the present invention.
Figure 6:
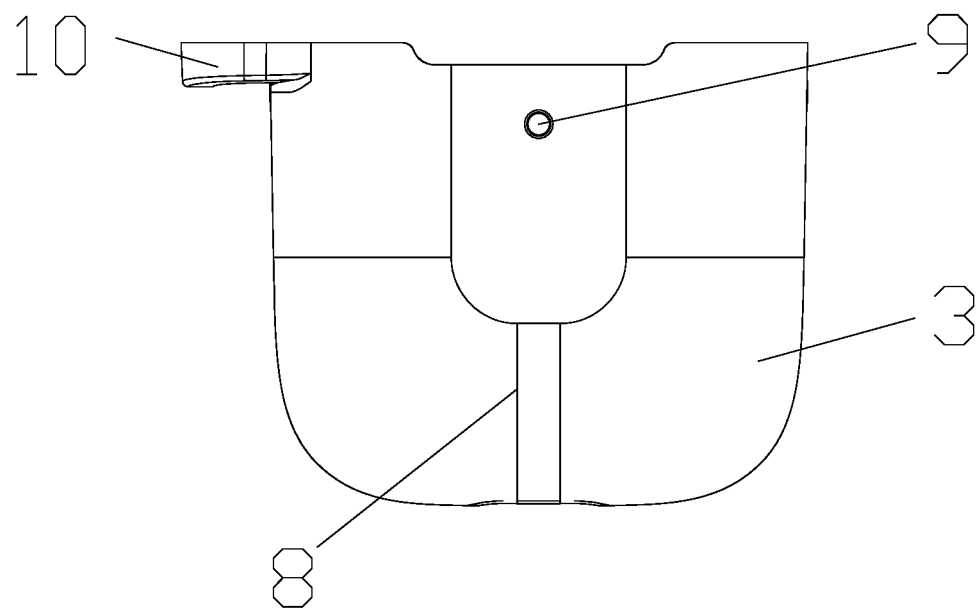
FIG. 6 is a rear-view schematic diagram of the structure according to the present invention.
Figure 7:
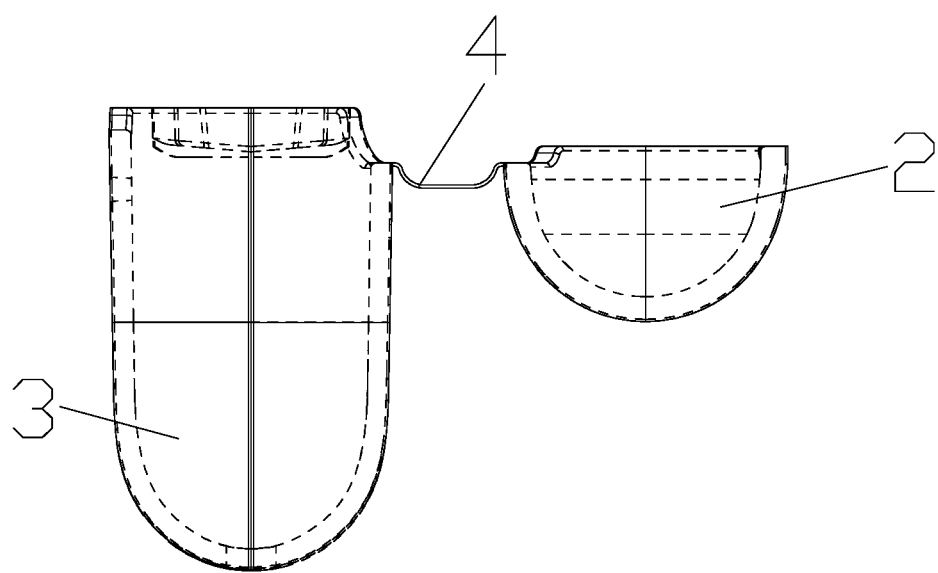
FIG. 7 is a left-view schematic diagram of the structure according to the present invention.
Figure 8:
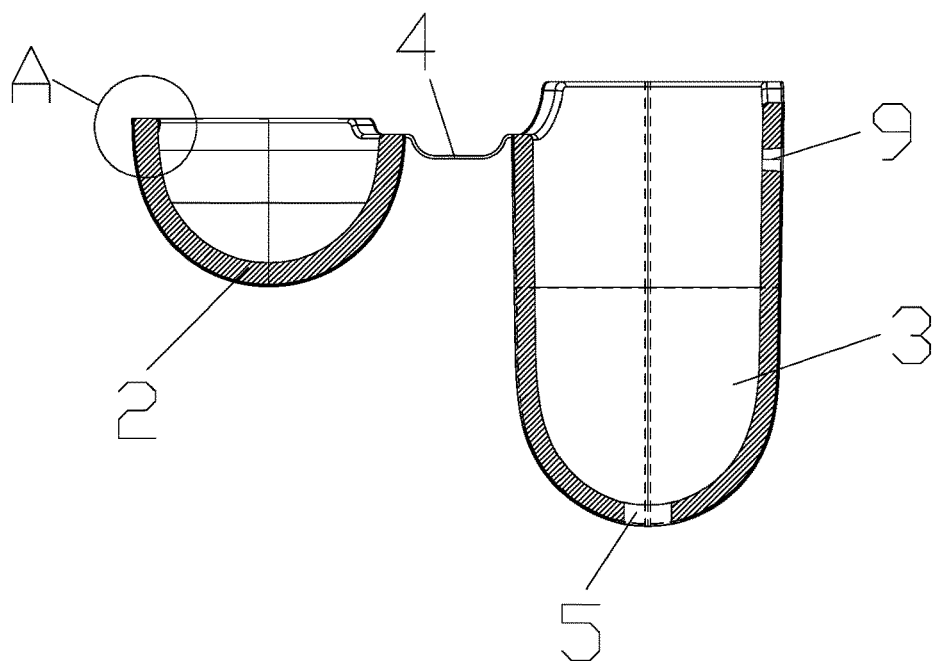
FIG. 8 is a right-sectional-view schematic diagram of the structure according to the present invention.
Figure 9:
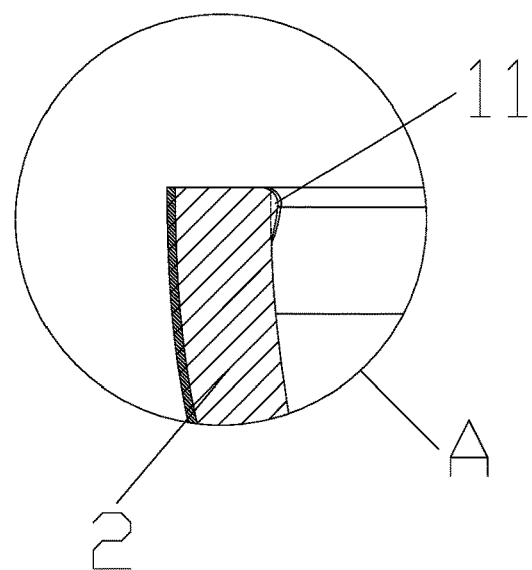
FIG. 9 is a partially enlarged schematic view at A in FIG. 8 of the present invention.

In the drawings: 1. Protective case body; 2. Upper cover; 3. Lower cover; 4. Connecting strap; 5. Charging port; 6. Snap; 7. Placement slot; 8. Anti-slip lines; 9. Indicator light hole; 10. Hanging ring; 11. Bump; 12. Laser engraving area.

DETAILED DESCRIPTION OF THE PREFERRED EMBODIMENT

A clear and complete description will be given hereinafter to the technical solution of the embodiments of the present invention, in combination with the drawings of the embodiments. Obviously, the embodiments described are only part of but not all the embodiments of the present invention. Any other embodiments obtained by those skilled in the field based on the embodiments of the present invention without contributing creative labor are all within the protection scope of the present invention.

With reference to FIGS. 1-9, a Bluetooth earphones case, comprising a protective case body 1 which consists of an upper cover 2 and a lower cover 3, wherein the upper cover 2 and the lower cover 3 match, a connecting strap 4 is arranged between the upper cover 2 and the lower cover 3, the lower cover 3 is made with a charging port 5 at the bottom, arranged with a snap 6 at the top of the front, and made with a placement slot 7 inside, and the outside of the protective case body 1 has anti-slip lines 8. Designed with a connected structure of the upper cover 2 and the lower cover 3 being connected by a connecting strap 4, the protective case is not only very convenient to use, strong and durable, more elegant and practical, but also prevents the outer cover from being lost, reducing the burden for use and solving the problems that most of the Bluetooth earphones cases in the prior art are inconvenient to use, not durable, and prone to damage, and the outer cover of the case is easily lost, increasing the burden for use, so it is worthy of popularization and use.

Further, an indicator light hole 9 is made in the back side of the lower cover 3 at the top. The indicator light hole 9 is designed to make it easy to indicate the charging status.

Further, a hanging ring 10 is bolted to the right side of the lower cover 3. The hanging ring 10 is designed for hanging and carrying the protective cover body 1 according to needs.

Further, the upper cover 2 has a bump 11 on its inner wall. The bump 11 is designed to close the upper cover 2 and the lower cover 3 more securely.

Further, a laser engraving area 12 is reserved in the front of the lower cover 3. The laser engraving area 12 is designed for laser engraving the protective case body 1 according to needs.

Further, the upper cover 2, the lower cover 3 and the connecting strap 4 are of a one-piece design, and the connecting strap is made of a TPU elastomer injection molding material, providing the connecting strap 4 an automatic rebound effect.

Figure 10:
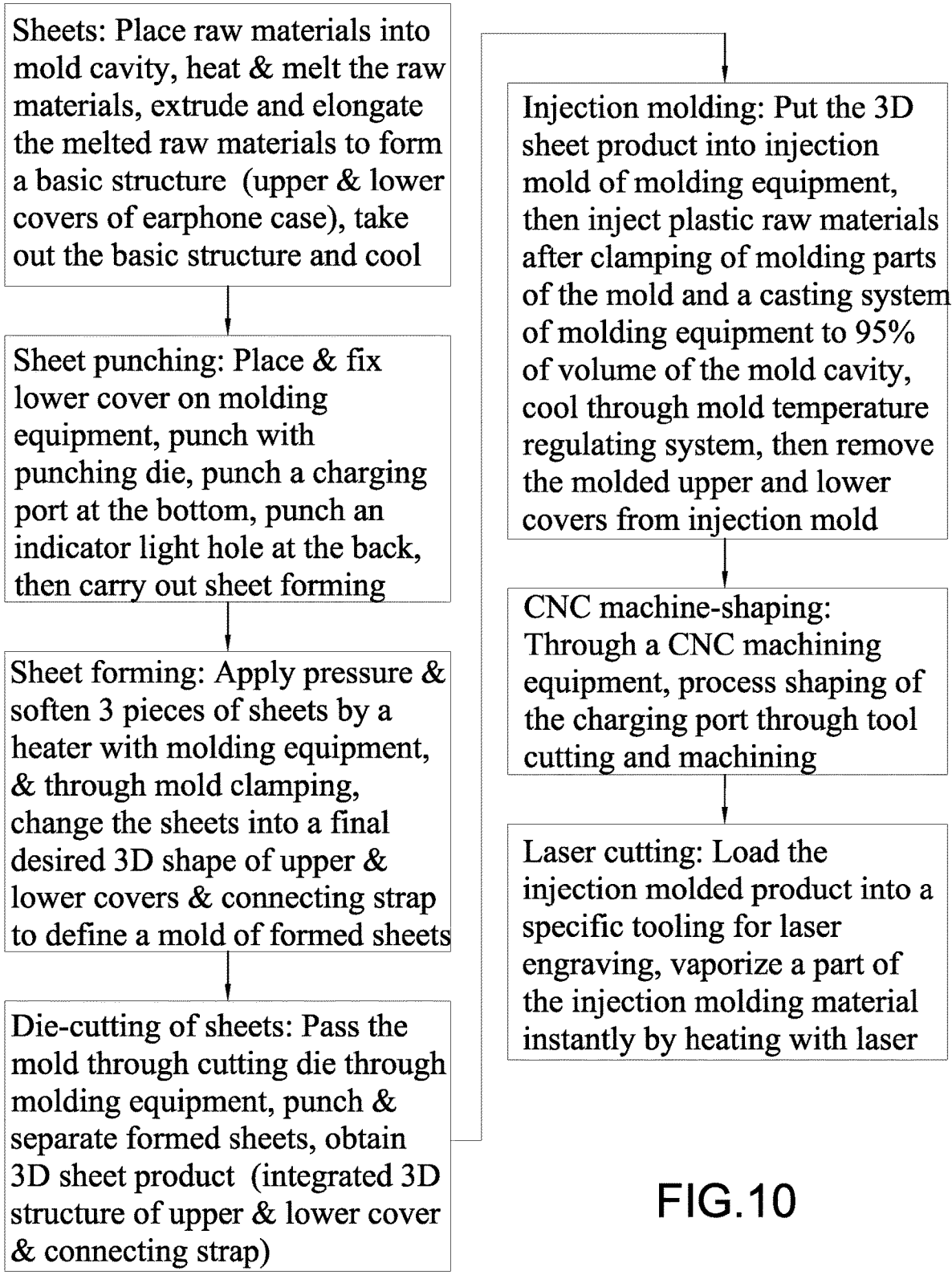
FIG. 10 is a schematic flowchart showing a production process of a wireless earphones case according to a preferred embodiment of the present invention.

Referring to FIG. 10 of the drawings, a production process of the wireless earphones case includes the following steps:

Step 1: Sheets: First place the prepared raw materials into the mold cavity for heating and melting, extrude and elongate the melted raw materials to form the basic structure of the upper and lower covers, take out the upper and lower covers, cool, and then punch.

Step 2: Sheet punching: Place and fix the lower cover on the equipment, punch the lower cover with a punching die, punch a charging port in the lower cover at the bottom, punch an indicator light hole in the lower cover at the back side, and then carry out the forming operation.

Step 3: Sheet forming: Apply pressure and soften three sheets using a heater through the equipment. Through the clamping of the forming die, the sheets are changed into the final desired 3D shape to complete the operation of the sheets forming process.

Step 4: Die-cutting of sheets: let the formed sheets pass through a cutting die through the equipment. During the clamping of the cutting die, the upper die punch moves relative to the lower die cavity to punch and separate the formed sheets, so as to obtain the required 3D sheet products.

Step 5: Injection molding: put and well position the formed and cut sheet into an injection mold, then close the mold, inject the plastic raw materials into the injection mold after clamping of the molding parts and the casting system, to about 95% of the mold cavity, cool through the mold temperature regulating system, and then remove the molded upper and lower covers from the injection mold, to complete the operation.

Step 6: CNC machine-shaping: put and position the injection molded products into special tooling through the CNC machining equipment, and complete the shaping of the charging port through tool cutting and machining.

Step 7: Laser cutting: Load and position the injection molded products into special tooling through the laser cutting equipment, vaporize the corresponding injection molding material instantly by high-temperature heating with the laser to get the required appearance and shape features.

It should be noted that the IMD process is adopted for manufacturing the Bluetooth earphones case, which greatly enhances the three-dimensional sense and color performance of the product appearance.

To use the protective case, put Bluetooth earphones into the placement slot 7 of the protective case body 1, and close the upper cover 2 and lower cover 3 by means of the connecting strap 4, at which point the snap 6 and the bump 11 improve stability and prevent the Bluetooth earphones from falling off. When the Bluetooth earphones need to be charged, insert the charger into the charging port 5 to charge the Bluetooth earphones and observe the charging status through the indicator light hole 9. Besides, the protective case body 1 can be laser engraved in the laser engraving area 12 according to personal needs, to make the protective case more elegant and durable.

Although the embodiments of the present invention have been illustrated and described, it should be understood to those skilled in the art that a variety of variations, modifications, replacements and variants can be made to these embodiments without departing from the principles and spirit of the present invention, and the scope of the present invention is limited by the appended claims and their equivalents.

What is claimed is:

1. A production process of wireless earphones case, characterized in that: the production process includes the following steps:

Step 1: Sheets: placing prepared raw materials into a mold cavity, heating and melting the prepared raw materials into melted raw materials, processing to extrude and elongate the melted raw materials to form a basic structure of upper and lower covers of the earphone case, taking out the basic structure of the upper and lower covers, and cooling before the processing sheet punching;

Step 2: Sheet punching: placing and fixing the lower cover on a molding equipment, punching the lower cover with a punching die, punching a charging port in the lower cover at the bottom, punching an indicator light hole in the lower cover at the back side, and then carrying out sheet forming;

Step 3: Sheet forming: applying pressure and soften three pieces of sheets, which comprises the upper cover, the lower cover and a connecting strap, using a heater through the molding equipment, through a mold clamping process for the mold, the three pieces of sheets are changed into a final desired 3D shape of the upper cover, the lower cover and the connecting strap to complete the sheets forming process to define a mold made of formed sheets of the upper cover, the lower cover and the connecting strap;

Step 4: Die-cutting of sheets: passing the mold made of formed sheets through a cutting die through the molding equipment so that during the clamping of the cutting die, an upper die punch moves relative to a lower die cavity to punch and separate the formed sheets, thus obtaining a required 3D sheet product, which is an integrated 3D structure of the upper cover, the lower cover and the connecting strap;

Step 5: Injection molding: putting and well positioning the formed and cut sheet of the 3D sheet product from step 4 into an injection mold of the molding equipment, then closing the mold, injecting plastic raw materials into the injection mold after clamping of molding parts of the mold and a casting system of the molding equipment to 95% of volume of the mold cavity, cool through a mold temperature regulating system, and then remove the molded upper and lower covers from the injection mold, to complete the operation;

Step 6: CNC machine-shaping: putting and positioning the injection molded product, which comprises the upper cover, the lower cover and the connecting strap, through a CNC machining equipment, and complete a processing of shaping of the charging port through tool cutting and machining;

Step 7: Laser cutting: loading and positioning the injection molded product into a tooling for laser engraving through a laser cutting equipment, vaporize an injection molding material corresponding to a part of the injection molded product instantly by high-temperature heating with laser to get a laser engraving area corresponding to an appearance and shape of the tooling for laser engraving.

* * * * *